Figure 1:
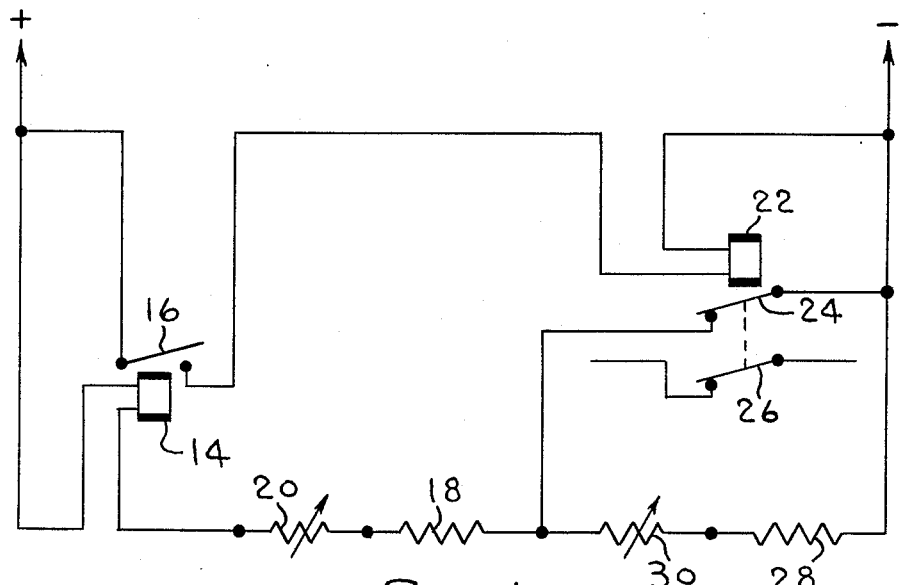

INVENTOR.
ROBERT SCHIMEK
BY John W. Michael
ATTORNEY

United States Patent Office 3,097,334
Patented July 9, 1963

3,097,334
AUTOMATIC CONTROL FOR BATTERY CHARGER
Robert Schimek, Milwaukee, Wis., assignor to Globe-Union Inc., Milwaukee, Wis., a corporation of Delaware
Filed Dec. 7, 1959, Ser. No. 857,589
3 Claims. (Cl. 320—40)

This invention relates to an automatic control for a battery charger. The control may have a number of applications such as, for example, in a battery powered television set.

The object of this invention is to provide a control which is accurate, relatively inexpensive to manufacture and requires only a small amount of energy from the battery for its operation.

Another object is to provide a control wherein both the minimum and maximum voltage control points can be adjusted.

The objects of this invention are attained by an automatic control including a voltage sensitive relay connected across the terminals of the battery and adapted to be energized and shut off the battery charger when the maximum control voltage of the battery is reached. A first and second variable resistance means are provided in series with the voltage sensitive relay to vary the maximum and minimum control voltages at which the relay will pick up and drop out. A shunt circuit is provided for the second variable resistance means used to adjust the minimum control point. This shunt circuit is adapted to shunt the second resistance when the battery voltage is below maximum and is operable upon reaching the maximum control voltage to open the shunt circuit and introduce the resistance into series with the voltage sensitive relay.

The shutting off of the battery charger and the introduction of the second variable resistance into the circuit will cause a relatively substantial voltage drop across the battery terminals when the maximum control voltage is reached. This sudden voltage drop at maximum control voltage will tend to cause the voltage sensitive relay to chatter and fail to operate properly upon reaching the maximum control voltage. To eliminate this problem, I provide a second time delay relay connected across the battery terminals in parallel with the voltage sensitive relay. The energization of such time delay relay is controlled by the voltage sensitive relay and the shunt circuit and battery charger are placed under control of the time delay relay. Thus, when maximum control voltage is reached the voltage sensitive relay will be actuated which, in turn, will close a switch to energize the time delay relay which will then shut off the battery charger and open the shunt circuit around the second variable resistance means. Thus, it is seen that by the use of the time delay relay there is a very slight time delay between the instant the voltage sensitive relay picks up and the instant the battery charger is shut off and the shunt circuit is opened. This slight delayed action operation allows the voltage sensitive relay to pick up completely before the voltage across it drops and thereby enables such relay to stay energized until the minimum control voltage is reached.

Figure 2:
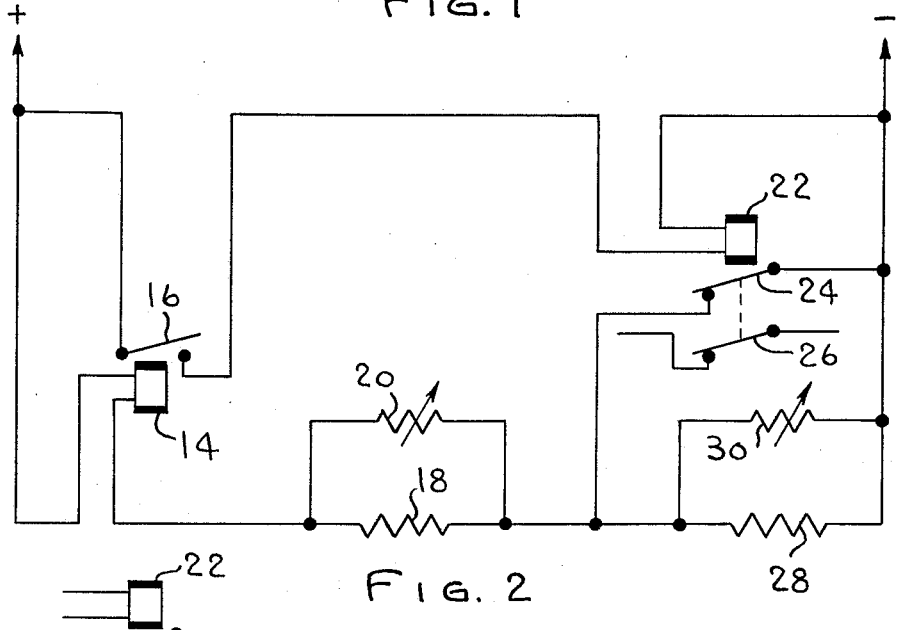
Figure 3:
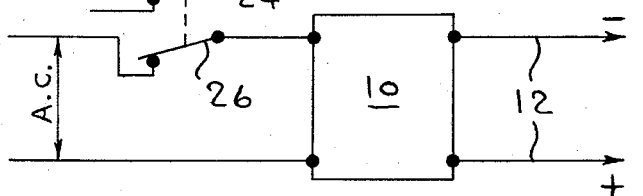

Other objects and advantages will be pointed out in, or be apparent from the specification and claims, as will obvious modifications of the two embodiments shown in the drawings, in which:

FIGS. 1 and 2 are simplified circuit diagrams of two modifications of a control embodying my invention; and FIG. 3 is a simplified circuit diagram of a battery charging circuit to be controlled.

Referring now to the drawing in detail, FIG. 1 shows the control circuit connected across the terminals of a battery as indicated by the plus and minus signs. The charging circuit is shown in FIG. 3 and includes a charger 10 connected to an A.C. power supply and controlled by a switch 26. Charger 10 has a pair of leads 12 for connection to the terminals of the battery.

The charger control includes a voltage sensitive control relay 14 connected across the terminals of the battery and having normally open switch contacts 16 connected in series with a time delay relay 22 across the battery terminals as shown in FIG. 1. When the battery terminal voltage reaches the maximum control point as the battery is brought up to the desired voltage by charging, control relay 14 will pick up at such predetermined maximum control voltage. To compensate for slight variations in the characteristics of the control relay from unit to unit and provide accurate control and adjustment of the maximum control voltage, I provide a fixed resistor 18 and a variable resistor 20 connected in series with relay 14 as shown. While a variable resistor could be used alone, the combination of a fixed and variable resistor gives a greater sensitivity of adjustment than would otherwise be possible. Similarly, a fixed resistor could be used alone but would require individual selection for each relay used to provide a given control point which, of course, could not be adjusted during operation.

The desired maximum control voltage will vary with a number of factors such as the rating of the battery employed. Assume for purposes of explanation that a 12-volt battery is being charged and that relay 14 is set to pick up at 15 volts. Thus, as the terminal voltage of the battery reaches 15 volts during charging, control relay 14 will pick up. Now if relay 14 was made to control switch 26 in the charging circuit directly, the relay would have a tendency to chatter due to the sudden drop in terminal voltage caused by the shut-off of the charging voltage and the introduction of additional resistance (resistors 28 and 30) into the control relay circuit (for purposes of controlling the minimum voltage control point at which relay 14 will drop out, as will be described hereinafter). Therefore, to eliminate this problem, I provide a second time delay relay 22 connected across the battery terminals in series with control relay contacts 16. Relay 22 has two pairs of normally closed contacts 24 and 26, as shown in FIGS. 1, 2 and 3. Thus, when control relay 14 picks up causing contacts 16 to close, relay 22 will be energized to open normally closed contacts 24 and 26. The opening of contacts 26 will shut off the charging current to the battery and the opening of contacts 24 will add the resistance of fixed and variable resistors 28 and 30, respectively, to the control relay circuit. As previously stated, the opening of the charging circuit and the addition of resistors 28 and 30 into the control relay circuit would normally reduce the voltage across relay 14 to a point where chattering would occur. However, by the use of the second relay 22 there is a very slight time delay between the instant relay 14 picks up and the instant switches 24 and 26 are opened. This slight delayed action operation allows relay 14 to pick up completely before the voltage across it drops and thereby enables relay 14 to stay energized until the minimum control voltage is reached. Resistors 28 and 30 serve to control the minimum control voltage in much the same manner as do resistors 18 and 20 control the maximum control voltage. As explained with respect to resistors 18 and 20, either variable resistor 30 or fixed resistor 28 could be used alone but it is preferred to use them together to thereby provide a greater sensitivity of adjustment than would otherwise be possible.

As shown in FIG. 2, an alternative arrangement of pairs of resistors 18, 20 and 28, 30 can be employed wherein the variable and fixed resistors are connected in parallel with each other. This arrangement will give a finer adjustment but over a smaller range than with the series arrangement shown in FIG. 1.

As an example of what happens, assume that relay 14 is set to pick up at 15 volts as previously stated and to drop out at 12.2 volts. When the terminal voltage reaches 15 volts relay 14 will pick up and contacts 16 will be closed (without at that point reducing the voltage across relay 14). The closing of contacts 16 will energize relay 22 and thereby open contacts 24 and 26. The opening of contacts 26 to shut off the charging current will cause an immediate drop of about 1.5 volts at the battery terminals and the introduction of resistors 28 and 30 into the control relay circuit by the opening of contacts 24 will cause an additional voltage drop at the terminals. Both relays 14 and 22 will remain energized until, due to an applied battery load and/or self-discharge, the voltage across the terminals reaches the minimum control voltage of 12.2 (set by variable resistor 30) at which point relay 14 drops out. The current drain on the battery due to the charging control circuit itself is small amounting to about 25 milliamps. for the embodiment described above. When relay 14 drops out contacts 16 will open to thereby deenergize relay 22 causing contacts 24 and 26 to close. The closing of contacts 24 will shunt resistors 28 and 30 and the closing of contacts 26 will energize charger 10 to again being charging the battery.

Although two embodiments of the present invention have been illustrated and described, it will be apparent to those skilled in the art that various changes and modifications may be made therein without departing from the spirit of the invention or from the scope of the appended claims.

I claim:

1. An automatic control for a battery charger comprising, a voltage sensitive relay winding adapted for connection across the terminals of a battery, said voltage sensitive relay winding having a pair of normally open voltage sensitive switch contacts operated by said voltage sensitive relay winding, a time delay relay winding adapted for connection across the terminals of a battery and parallel with said voltage sensitive relay winding, said time delay relay winding having first and second pairs of normally closed time delay switch contacts operated directly by said time delay relay winding, said voltage sensitive switch contacts connected in series with said time delay relay winding and operable in response to the energization of said voltage sensitive relay winding to energize said time delay relay winding when said voltage sensitive relay winding is energized, said first pair of time delay switch contacts operable in response to the energization of said time delay relay winding and adapted when so actuated to shut off the battery charger, a first variable resistance means connected in series with said voltage sensitive relay winding and adapted to adjust the maximum control voltage at which the voltage sensitive relay winding will be energized, a second variable resistance means connected in series with said voltage sensitive relay winding and adapted for adjustment of the minimum control voltage at which said voltage sensitive relay winding will drop out after once being energized, and a shunt circuit means for shunting said second variable resistance means, said shunt means including said second pair of time delay switch contacts, said second switch contacts adapted when actuated to open said shunt circuit and thereby introduce the resistance of said second variable resistance means into the voltage sensitive relay winding circuit.

2. An automatic control for a battery charger according to claim 1 in which said first and second variable resistance means each includes a variable resistor and a fixed resistor connected in series with each other.

3. An automatic control for a battery charger according to claim 1 in which said first and second variable resistance means each includes a fixed resistor and a variable resistor connected in parallel with each other.

References Cited in the file of this patent
UNITED STATES PATENTS

| | | |
|---|---|---|
| 1,538,588 | Pohler | May 19, 1925 |
| 1,587,061 | Anderson | June 1, 1926 |
| 2,229,432 | Amsden | Jan. 21, 1941 |
| 2,307,576 | De Croce | Jan. 5, 1943 |